(12) United States Patent
Matsumoto (10) Patent No.: US 11,683,549 B2
(45) Date of Patent: Jun. 20, 2023

(54) INFORMATION DISTRIBUTION APPARATUS, INFORMATION DISTRIBUTION METHOD, AND INFORMATION DISTRIBUTION PROGRAM

(71) Applicant: JVCKENWOOD Corporation, Yokohama (JP)

(72) Inventor: Eiji Matsumoto, Yokohama (JP)

(73) Assignee: JVCKENWOOD CORPORATION, Kanagawa (JP)

( * ) Notice: Subject to any disclaimer, the term of this patent is extended or adjusted under 35 U.S.C. 154(b) by 0 days.

(21) Appl. No.: 17/389,939

(22) Filed: Jul. 30, 2021

(65) Prior Publication Data

US 2021/0360307 A1    Nov. 18, 2021

Related U.S. Application Data

(63) Continuation of application No. PCT/JP2019/048261, filed on Dec. 10, 2019.

(30) Foreign Application Priority Data

Mar. 18, 2019 (JP) ................................ 2019-049630

(51) Int. Cl.
*H04N 21/218* (2011.01)
*H04N 21/44* (2011.01)
(Continued)

(52) U.S. Cl.
CPC ......... *H04N 21/2668* (2013.01); *G06V 20/46* (2022.01); *H04N 21/21805* (2013.01);
(Continued)

(58) Field of Classification Search
CPC ......... H04N 21/2668; H04N 21/21805; H04N 21/25891; H04N 21/44008; H04N 21/4532; G06V 20/46
See application file for complete search history.

(56) References Cited

U.S. PATENT DOCUMENTS 8,662,975 B1 * 3/2014 Wieczorek .............. A63F 13/30
463/9
11,025,808 B2 * 6/2021 Ikeda ................. H04N 5/23218
(Continued)

FOREIGN PATENT DOCUMENTS

JP    2010512059 A    4/2010
JP    2014102417 A    6/2014
(Continued)

*Primary Examiner* — Nnenna N Ekpo
(74) *Attorney, Agent, or Firm* — Procopio, Cory, Hargreaves & Savitch LLP (57) ABSTRACT

An information distribution apparatus includes: a user information receiving unit configured to receive user information from user devices that respective users have, the user information including at least one of user-captured images and positional information of the users, and user IDs of the users; a user specifying unit configured to specify at least one user from a plurality of pieces of user information; an other user extraction unit configured to extract at least one other user who is present near the specified user based on at least one of the user-captured images and the positional information of the user; a related user group information generation unit configured to generate related user group information in which at least one of the pieces of user information is associated with at least one of pieces of other user information.

6 Claims, 9 Drawing Sheets

(51) Int. Cl.
  *H04N 21/45*     (2011.01)
  *G06V 20/40*     (2022.01)
  *H04N 21/2668*   (2011.01)
  *H04N 21/258*    (2011.01)

(52) U.S. Cl.
  CPC . *H04N 21/25891* (2013.01); *H04N 21/44008* (2013.01); *H04N 21/4532* (2013.01)

(56) References Cited

U.S. PATENT DOCUMENTS

| | | | |
|---|---|---|---|
| 11,412,171 B2* | 8/2022 | Boyle | H04N 5/23245 |
| 2008/0132243 A1 | 6/2008 | Spalink et al. | |
| 2014/0141811 A1* | 5/2014 | Kawazoe | H04W 4/029 |
| | | | 455/456.3 |
| 2015/0116501 A1* | 4/2015 | McCoy | H04N 5/23206 |
| | | | 348/169 |
| 2015/0235479 A1 | 8/2015 | Chavez et al. | |
| 2016/0098941 A1* | 4/2016 | Kerluke | G09B 19/0038 |
| | | | 700/91 |
| 2017/0064240 A1* | 3/2017 | Mangat | A63F 13/212 |
| 2019/0166167 A1 | 5/2019 | Kurata et al. | |
| 2019/0267041 A1* | 8/2019 | Ricciardi | G11B 27/036 |
| 2020/0128902 A1* | 4/2020 | Brown | A42B 3/042 |

FOREIGN PATENT DOCUMENTS

| | | |
|---|---|---|
| JP | 2017207974 A | 11/2017 |
| JP | 2018098769 A | 6/2018 |

* cited by examiner

| RANK | PLAYER ID | DISTANCE (m) | PRESENCE OR ABSENCE OF VIDEO IMAGES |
|---|---|---|---|
| 1 | D | 6 | PRESENT |
| 2 | B | 5 | PRESENT |
| 3 | C | 4 | PRESENT |
| 4 | A | — | — |
| 5 | E | -4 | ABSENT |
| 6 | F | -5 | ABSENT |
| 7 | G | -6 | ABSENT |

| RANK | PLAYER ID | DISTANCE (m) | PRESENCE OR ABSENCE OF VIDEO IMAGES |
|---|---|---|---|
| 1 | B | 8 | ABSENT |
| 2 | D | 4 | PRESENT |
| 3 | C | 4 | PRESENT |
| 4 | A | — | — |
| 5 | E | -5 | PRESENT |
| 6 | G | -5 | PRESENT |
| 7 | F | -8 | ABSENT |

INFORMATION DISTRIBUTION APPARATUS, INFORMATION DISTRIBUTION METHOD, AND INFORMATION DISTRIBUTION PROGRAM

CROSS REFERENCE TO RELATED APPLICATION

This application is a Bypass Continuation of PCT/JP2019/048261 filed on Dec. 10, 2019, which claims the benefit of priority from Japanese patent application No. 2019-049630, filed on Mar. 18, 2019, the disclosure of which is incorporated herein in its entirety by reference.

BACKGROUND

The present disclosure relates to an information distribution apparatus, an information distribution method, and an information distribution program.

Japanese Unexamined Patent Application Publication No. 2018-98769 discloses a technique of extracting user attribute data associated with a user ID, extracting training video content from a matching table, and displaying the extracted content. Accordingly, each user is provided with appropriate content.

SUMMARY

Incidentally, in games such as a marathon, a bicycle race, a horse race, or soccer in which a large number of players (users) participate, it is sometimes difficult for a supporter to find a user, who is a target to be supported, from a group of such a large number of people. Further, in these games, a supporter may want to focus on and support a group including a user, who is a target to be supported, and people who are present near the target to be supported.

The aim of the present disclosure is to provide an information distribution apparatus, an information distribution method, and an information distribution program for assisting in observing a specific user from a group of a large number of people by extracting a specific user and people who are present near the specific user from the group including the large number of people.

An information distribution apparatus according to this embodiment includes:

a user information receiving unit configured to receive user information from user devices that respective users have, the user information including at least one of user-captured images captured by the respective user devices and positional information of the users measured by the respective user devices, and user IDs of the users;

a user specifying unit configured to specify at least one user from a plurality of pieces of user information;

an other user extraction unit configured to extract at least one other user who is present near the specified user based on at least one of the user-captured images and the positional information of the users that have been received;

a related user group information generation unit configured to generate related user group information in which at least one of the pieces of user information is associated with at least one of pieces of other user information, which are information pieces on other users that have been extracted; and a distribution unit configured to externally distribute the related user group information.

An information distribution method according to this embodiment includes:

receiving user information from user devices that respective users have, the user information including at least one of user-captured images captured by the respective user devices and positional information of the users measured by the respective user devices, and user IDs of the users;

specifying at least one user from a plurality of pieces of user information;

extracting at least one other user who is present near the specified user based on at least one of the user-captured images and the positional information of the users that have been received;

generating related user group information in which at least one of the pieces of user information is associated with at least one of pieces of other user information, which are information pieces on other users that have been extracted; and externally distributing the related user group information.

An information distribution program according to this embodiment causes a computer to execute the following processing of:

receiving user information from user devices that respective users have, the user information including at least one of user-captured images captured by the respective user devices and positional information of the users measured by the respective user devices, and user IDs of the users;

specifying at least one user from a plurality of pieces of user information;

extracting at least one other user who is present near the specified user based on at least one of the user-captured images and the positional information of the users that have been received;

generating related user group information in which at least one of the pieces of user information is associated with at least one of pieces of other user information, which are information pieces on other users that have been extracted; and externally distributing the related user group information.

According to this embodiment, it is possible to assist in observing a specific user from among a large number of users.

DETAILED DESCRIPTION

Figure 1:
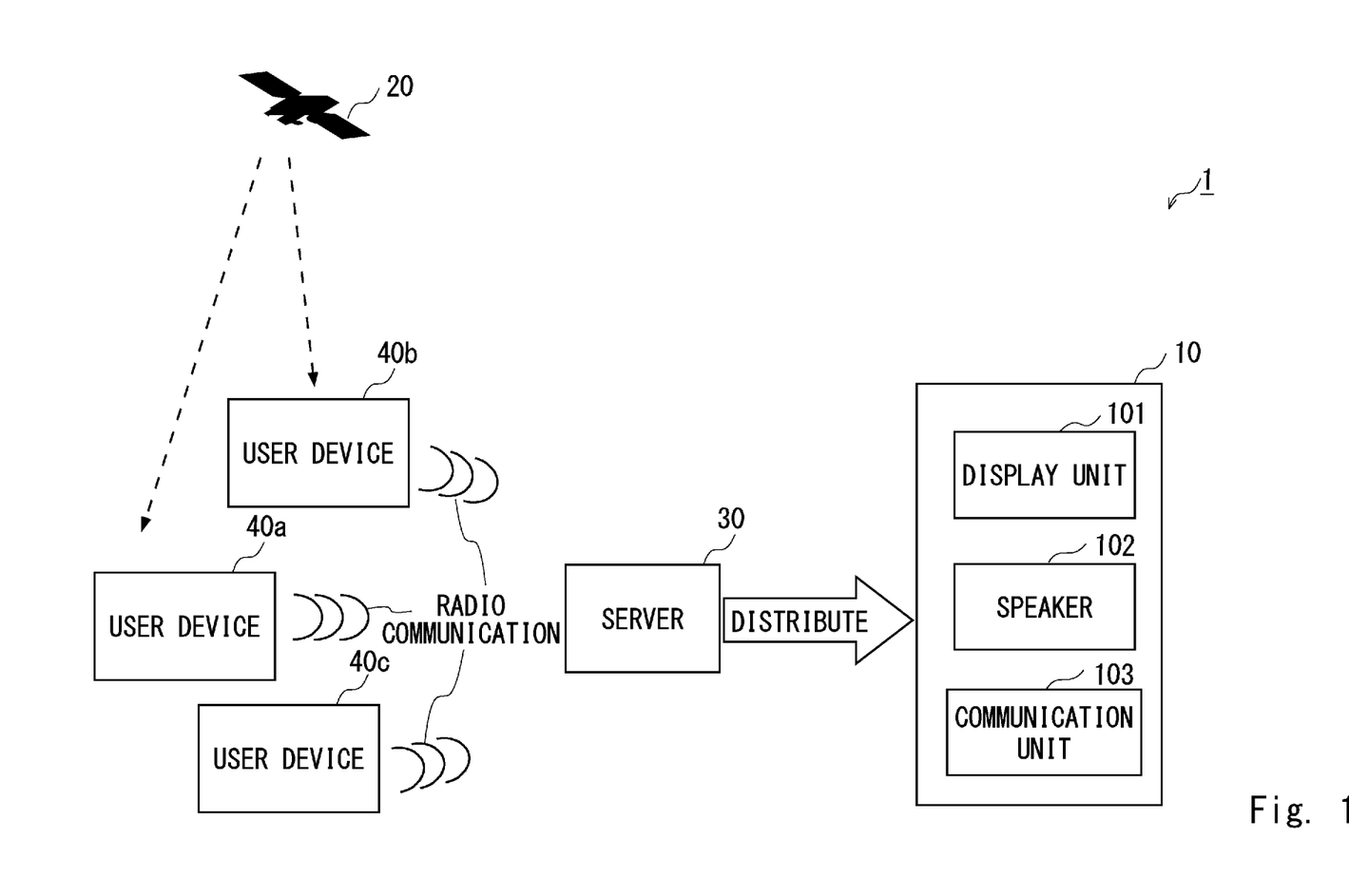
FIG. 1 is a diagram for describing an outline of an information distribution apparatus according to the present disclosure.
Figure 2:
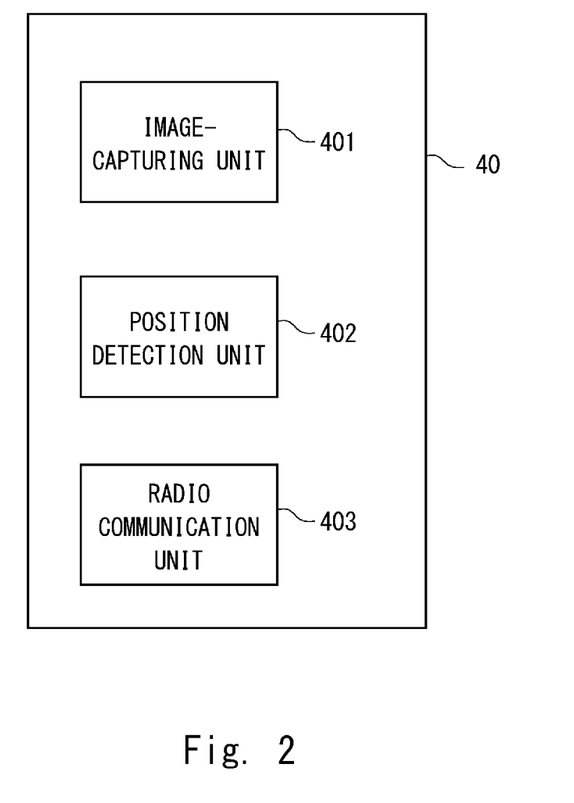
FIG. 2 is a block diagram showing a configuration of a user device according to an embodiment of the present disclosure.

Referring to FIGS. 1 and 2, an outline of an information distribution system according to the present disclosure will be described.

In games such as a marathon in which a number of players participate, for example, this distribution system allows each participant to have a user device 40, wirelessly communicates user information, the user information including at least one of a user-captured image and positional information of a user, and a user ID, and collects the information in a server 30. Each of the user information pieces that have been collected is associated as related user group information including a specific user (a target to be supported) and users who are present near the specific user based on at least one of the user-captured images and the positional information of the users and is distributed to a communication terminal 10 owned by a supporter who wants to watch the game. In this way, a supporter who wants to watch the game in which a large number of participants participate is able to enjoy watching the game focusing on a group including a participant, who is a target to be supported, and participants who are present near the participant to be supported from among a large number of participants. For example, a supporter who has received the related user group information by a communication terminal such as a smartphone is able to view the related user group information as a map display in which positions of the respective players are arranged or as a list display with thumbnails indicating the ranking or the like of each player in the group. Preferably, the supporter watches the video of the player, who is a target to be supported, captured by the user devices 40 of the players who are present near the target to be supported.

In this information distribution system, it is possible to acquire positional information of the respective participants by a positioning system that uses an artificial satellite 20. A satellite positioning system such as a Global Positioning System (GPS) in the United States and Global Navigation Satellite System (GLONASS) in Russia may be, for example, used. In games such as a marathon or soccer, in order to grasp the exact position (error 1 m class) of each of crowded players, it is preferable to perform positioning using signals transmitted from a satellite that complements GPS (e.g., Quasi-Zenith Satellite System Michibiki).

FIG. 2 is a block diagram showing a configuration of the user device 40. The user device 40 includes an image-capturing unit 401, a position detection unit 402, and a radio communication unit 403. The image-capturing unit 401, which is, for example, a wearable camera that can capture images near a user, such as the front and back of the user, includes an image sensor (e.g., a CCD/CMOS image sensor). Such a camera is preferably a high-resolution camera capable of identifying characters and colors as well. The position detection unit 402 measures positions of users who are wearing the user devices 40 using the aforementioned positioning system. The radio communication unit 403 is able to communicate with the server 30 wirelessly, and wirelessly transmit, to the sensor 30, data of images captured by the image-capturing unit 401, the positional information detected by the position detection unit 402, and user IDs such as uniform numbers or bib numbers of the users, the registration numbers, the names or the like by which the users can be identified. The radio communication unit 403 may perform wireless communication with an external device (e.g., a server) by, for example, Bluetooth (registered trademark) Low Energy (hereinafter it will be referred to as BLE), ZigBee (registered trademark) or Wi-Fi (registered trademark). The user device may include a controller. This controller includes a function of executing various kinds of control based on various kinds of programs stored in a storage unit and is implemented by a central processing unit (CPU), a read-only memory (ROM), a random access memory (RAM), an input/output port (I/O) or the like.

Further, the user device 40 may include a microphone that collects ambient sounds of a user who wears the microphone and transmit the collected voice data to the server 30, although the microphone is not shown in FIG. 2.

As shown in FIG. 1, a communication terminal 10 owned by a supporter includes a display unit 101, a speaker 102, and a communication unit 103. The display unit 101 includes any preferable display such as a liquid crystal display (LCD) or a touch screen display. The communication unit 103 is able to communicate with the server 30 via a network and receive data of images captured by the image-capturing unit 401, positional information detected by the position detection unit 402, and voice data of ambient sounds collected by the microphone.

Examples of the network include a local area network (LAN) and a wide area network (WAN), like the Internet. Further, the communication network may be implemented by using an arbitrary known network protocol, including various types of wired or wireless protocols, such as Ethernet (registered trademark), Universal Serial Bus (USB), FIREWIRE (registered trademark), Global System for Mobile Communications (GSM (registered trademark)), Enhanced Data GSM (registered trademark) Environment (EDGE), Code Division Multiple Access (CDMA), Time Division Multiple Access (TDMA), Bluetooth (registered trademark), Wi-Fi (registered trademark), Voice over Internet Protocol (VoIP), Wi-MAX (registered trademark), or other types of arbitrary suitable communication protocols.

As described above, the communication terminal 10, which is device for enabling a supporter who watches the game to view data of images captured by game participants, positional information, and voice data of ambient sounds, may be a mobile communication terminal or a fixed communication terminal. The mobile communication terminal may be, for example, a mobile terminal such as a mobile telephone, a smartphone, a tablet terminal, or a wearable terminal (smart glasses etc.) The fixed communication terminal may be a personal computer, a multifunctional television, a set-top box or the like.

Referring next to FIGS. 3-7, functions of a server, which is an information distribution apparatus and is one of the features of the present disclosure, will be described. While the present disclosure can be applied to games such as a marathon, a bicycle race, a horse race, soccer, or a car race in which a number of players participate, a case in which the present disclosure is applied to a marathon will be described in the following.

Figure 3:
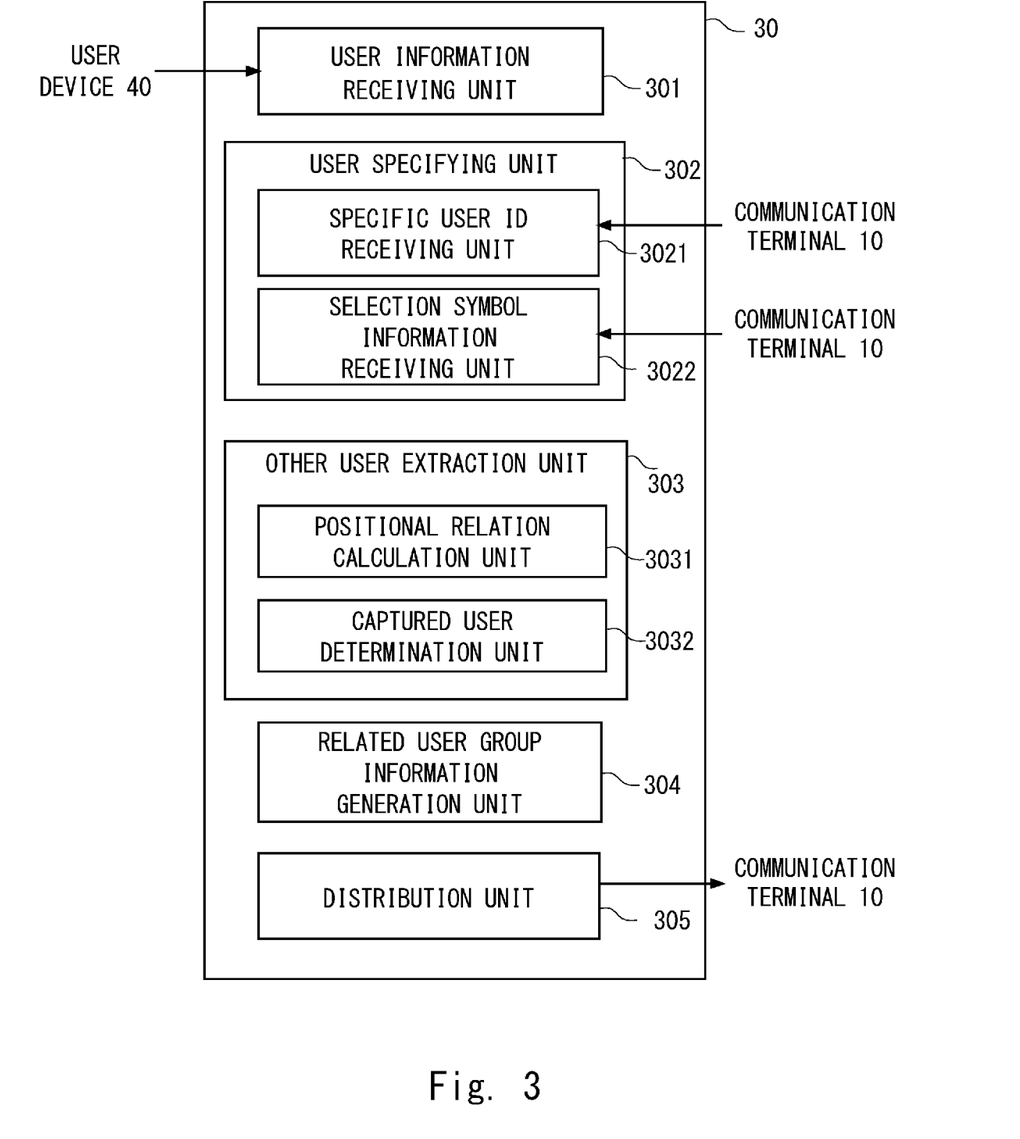
FIG. 3 is a block diagram showing a configuration of a server according to the embodiment of the present disclosure.

FIG. 3 is a block diagram showing a configuration of the server 30. The server 30 includes a user information receiving unit 301, a user specifying unit 302, an other user extraction unit 303, a related user group information generation unit 304, and a distribution unit 305. The user specifying unit 302 may further include a specific user ID receiving unit 3021 and a selection symbol information receiving unit 3022. The other user extraction unit 303 may further include a positional relation calculation unit 3031 and a captured user determination unit 3032.

Figure 4:
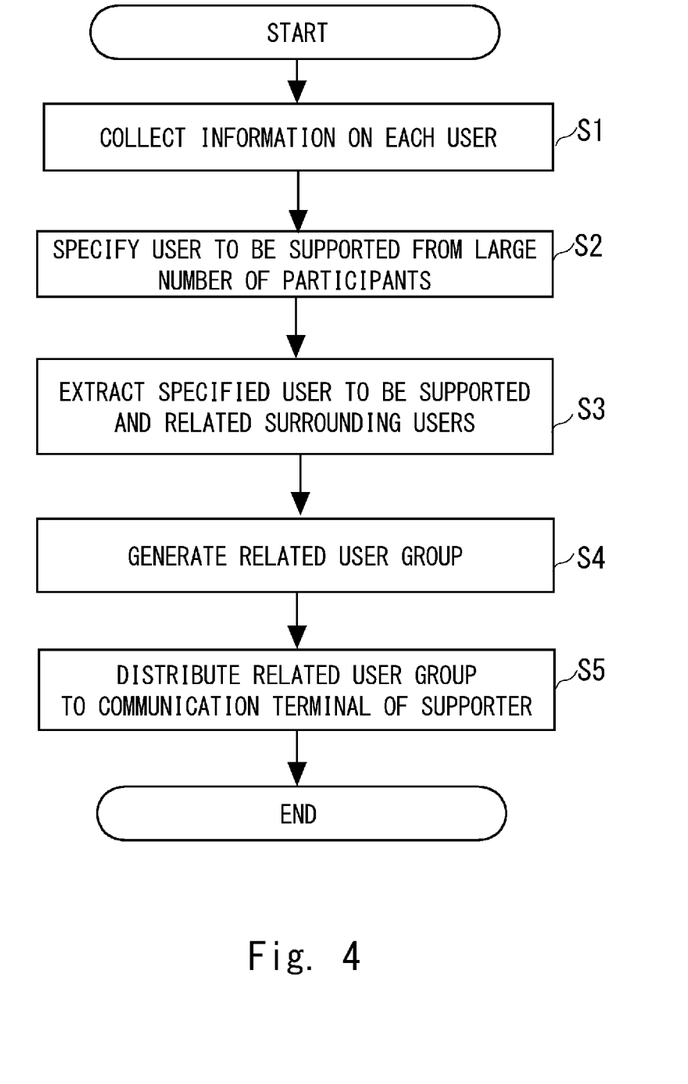
FIG. 4 is a flowchart showing an operation processing of the server according to the embodiment of the present disclosure.
Figure 5:
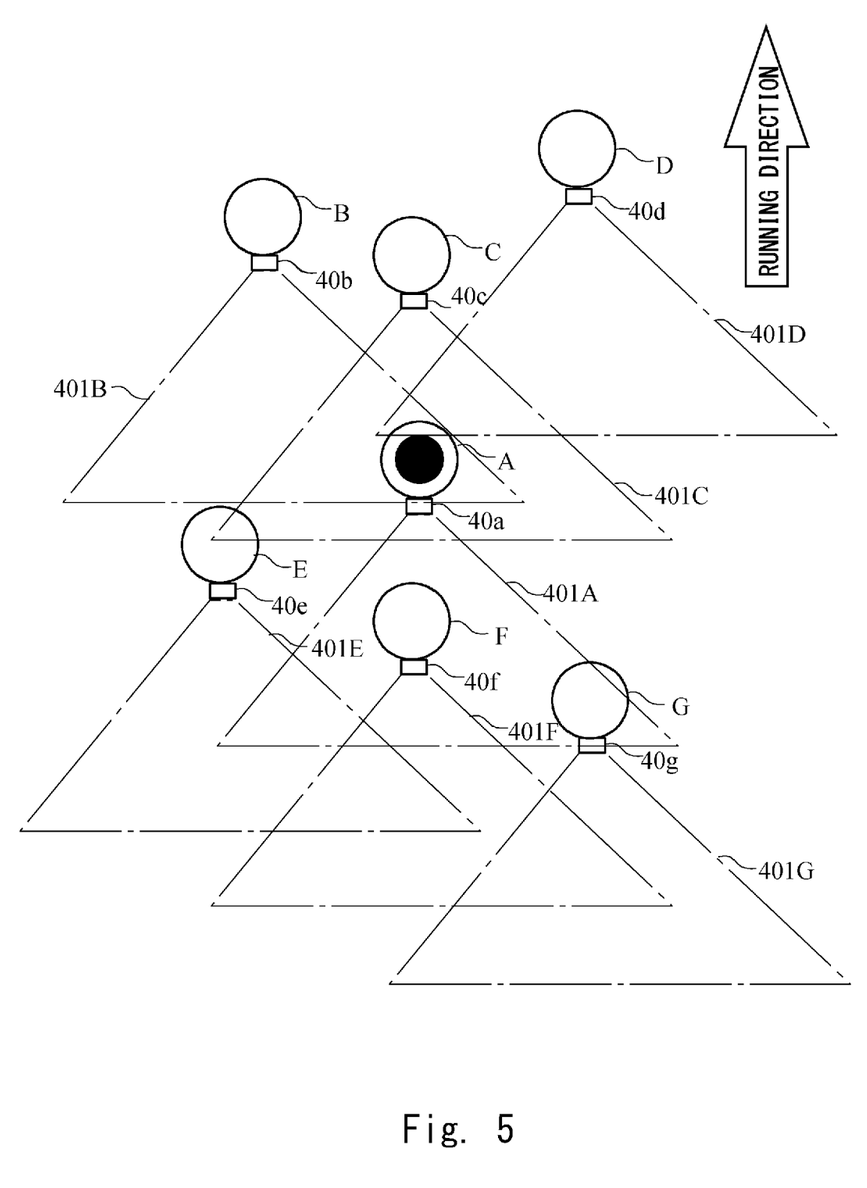
FIG. 5 is a diagram for describing a group of people of participants who participate in a marathon according to the embodiment of the present disclosure.

FIG. 4 is a flowchart showing operation processing of the server 30. FIG. 5 is a diagram for describing a group of people among a large number of participants who participate in a marathon. This group of people includes a player A to be supported and players B, C, D, E, and F who are present near the player A. In the example shown in FIG. 5, each player wears a user device 40 on his/her back and the respective image-capturing units of the respective user devices 40 are capturing images in a direction opposite to the running direction. FIG. 5 shows respective imaging regions 401A-401F having a substantially triangular shape that are extended from the respective user devices 40.

The user information receiving unit 301 receives the user information from each of the user devices 40, the user information including at least one of the captured data and the positional information, and the user ID (Step S1).

Next, the user specifying unit 302 specifies the user to be supported from a large number of participants (Step S2). A predetermined user such as a favorite player or a leading runner may be selected as a specific user. Alternatively, the supporter may input the user ID from the communication terminal 10 that the supporter has. Then, the specific user ID receiving unit 3021 may receive the input data from the communication terminal 10. Thereby, the user specifying unit 302 can specify the user.

Alternatively, the supporter may select a symbol such as a pin icon of the specific player generated by the related user group information generation unit 304 and transmit it to the server from the communication terminal 10 that the supporter has. The selection symbol information receiving unit 3022 may receive the selected data from the communication terminal 10. Thereby, the user specifying unit 302 can specify the user. In this example, the player A to be supported shown in FIG. 5 is the specific user.

The other user extraction unit 303 extracts the specified user and related surrounding users (a group of people) (Step S3). For example, the positional relation calculation unit 3031 may calculate the positional relations (front and back or right and left with respect to the running direction, or the distance from each other) of the respective users (the respective players) based on the positional information of the respective user devices 40 and extract the related surrounding users in accordance with the distances from the specific user (the player A) (within a predetermined distance from the player A). For example, in this example, the players B, C, D, E, F, and G who are within 10 m from the specific user (the player A) may be extracted as the related surrounding users.

Alternatively, the other user extraction unit 303 may extract user who wears the user device 40 capturing the specific user (the player A) as related surrounding user. In FIG. 5, the specific user (the player A) is included in a part of each of the imaging regions 401B, 401C, and 401D (angles of view) of the image-capturing units of the respective user devices 40 worn by players who are present near the specific user. The captured user determination unit 3032 capable of recognizing images of the captured data and specifying persons etc. may recognize images of the faces, bibs etc. of the players. Then, the captured user determination unit 3032 may specify surrounding users who are capturing images of the specific user (the player A), and extract these users as other users. In this way, in this example, the players B, C, and D are capturing images of the specific user (the player A), whereby it is possible to extract the players B, C, and D as other users.

As described above, the related user group information generation unit 304 generates related user group information including at least one of a pieces of user information of the specific user and at least one of pieces of other user information on the related surrounding users (other users) (Step S4). The related user group information may be generated as information (related user group positional information) which shows the positions of the respective players by symbols such as pin icons on a map as shown in FIG. 5. In this case, the related user group positional information may display the pin icon of the player to be supported and pin icons of players who are present near the player to be supported by different forms with different colors or shapes. Further, in this case, the related user group information may be generated as information in which video data captured by the user devices 40 that the respective players have is linked from the pin icons of the respective players. Accordingly, the supporter is able to view video images captured by the cameras the respective players have by selecting the pin icons of the respective players from the communication terminal 10.

The related user group information generation unit 304 may generate, for example, related user group information including positional information of the user information of the specific user and video data captured by the user devices 40 that the respective players have. Accordingly, the positional information of the specific user in association with the video data that have been captured by users who are present near the specific user and show the specific user can be distributed to the communication terminal 10 of the supporter. In this case, the other user extraction unit 303 extracts other users based on one of the positional information of the respective user devices 40 and specified result of other users who capture images of the specific user by the captured user determination unit 3032. More preferably, the other user extraction unit 303 extracts other users based on both of them.

Figure 6:
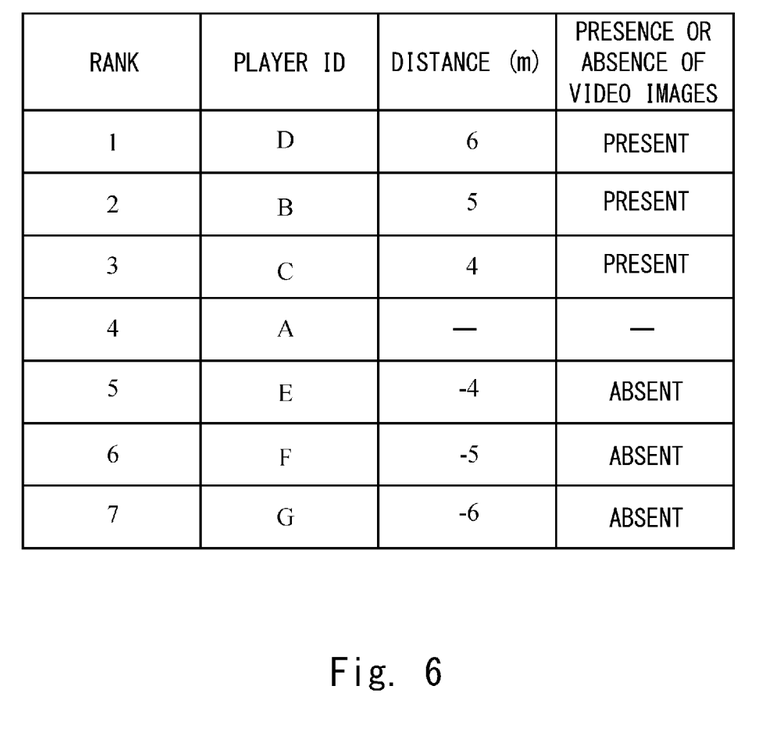
FIG. 6 is a diagram showing one example of related user group information.

Alternatively, the related user group information may be generated as a list display as shown in FIG. 6. Further, the item indicating a distance (m) indicates the distance from the player A who is to be supported. In this example, the distance is shown with a plus sign for the forward direction from the player A to be supported and with a minus sign for the backward direction therefrom. In this case, thumbnails of data captured by the user devices 40 of the respective players may be displayed in the item indicating the presence or the absence of video images. The presence or the absence of video images here indicates whether or not images of the player A to be supported are being captured, which is determined by the captured user determination unit 3032. Since the video images captured by the players D, B, and C are "present" in FIG. 6, a supporter is able to view the video images of the player A from the link to these video images. Although the video images of the user devices 40 of the players E, F, and G are "absent" in FIG. 6, the supporter is still able to view these video images from the link to these video images.

The distribution unit 305 distributes the thus generated related user group information to the communication terminal 10 of the supporter (Step S5). Accordingly, the supporter is able to enjoy watching the game focusing on a group including the player to be supported and players who are present near the player to be supported from among a large number of participants. Further, the supporter is able to constantly observe at least one of images of the player to be supported captured by each of the players who are present near the player to be supported and the transition of the current position of a group including the player to be supported and players who are present near the player to be supported.

MODIFIED EXAMPLES

Figure 7:
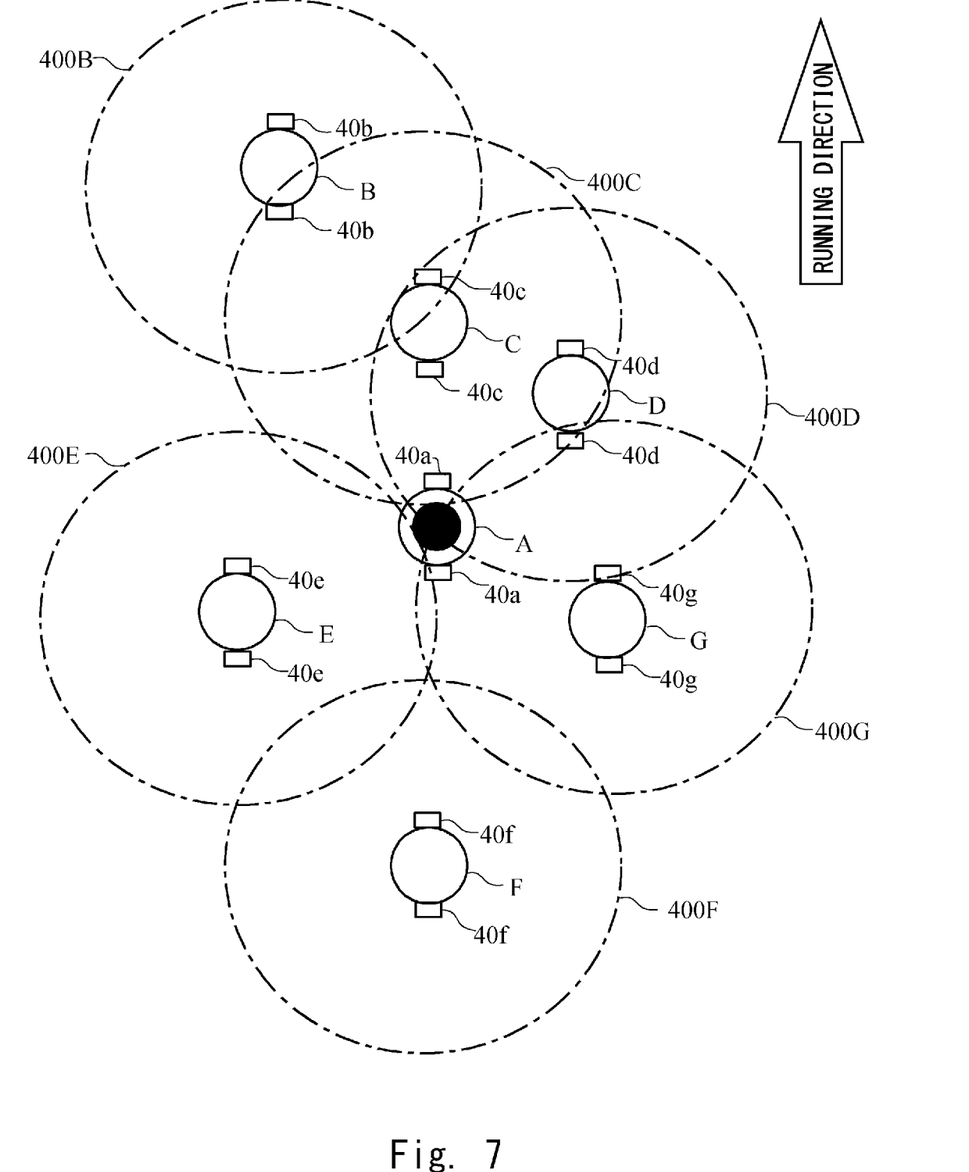
FIG. 7 is a diagram for describing a group of people of participants who participate in a marathon according to a modified example of FIG. 5.

FIG. 7 is a diagram for describing a group of participants who participate in a marathon according to a modified example of FIG. 5. The group of people includes a player A to be supported and players B, C, D, E, and F who are present near the player A. Each of the players wears one of the user devices 40 on both his/her front and back, and each of the image-capturing units captures images of the running direction and a direction that is opposite to the running direction. FIG. 7 shows substantially circular imaging regions 401A-401F that are extended from the respective user devices 40. While the example in which each participant wears the user device 40 on both his/her front and back is shown in FIG. 7, this is merely an example and one of the user devices 40 may instead be attached also to both sides of each of the participants. In this modified example, it is possible to capture images of a participant from all directions by a plurality of user devices 40 that the respective participants have. In this example as well, the player A to be supported shown in FIG. 7 is a specific user.

Referring to FIG. 7, an example of extracting the specific user and the related surrounding users according to the modified example (Step S3) will be described.

For example, the positional relation calculation unit 3031 calculates the positional relation (front and back or right and left with respect to the running direction, or the distance from each other) based on the positional information of the respective user devices 40. Then, the related surrounding users may be extracted from the positional relation (within a predetermined distance from the player A) with the specific user (the player A). In this example, for example, the players B, C, and D, who are running in front of the specific user, may be extracted as other users. For example, in this example, the players E, F, and G, who are running behind the specific user, may be extracted as other users. By employing a configuration according to the modified example, the related user group information generation unit 304 is able to acquire images of the specific user captured from the front from the user devices 40 of the other players B, C, and D and acquire images of the specific user captured from behind from the user devices 40 of the other players E, F, and G. The supporter adds desired positional relation information to the user ID to be transmitted and transmits them to the specific user ID receiving unit 3021. Thereby, the supporter is able to receive distributed images of the specific user captured from a desired direction from the server 30.

Alternatively, users who wears the user devices 40 capturing images of the specific user (the player A) may be extracted as related surrounding users. In FIG. 7, the specific user (the player A) is included in a part of each of the imaging regions 401C, 401D, 401E, and 401G (angles of view) of the image-capturing units of the players who are present near the specific user. Further, the captured user determination unit 3032 may recognize images of the faces of the players, bibs that the players wear etc., and users who are present near the specific user and capturing images of the specific user may be specified. Therefore, since the players C, D, E, and G are capturing images of the specific user (the player A) in this example, the players C, D, E, and G may be extracted as the related surrounding users.

Figure 8:
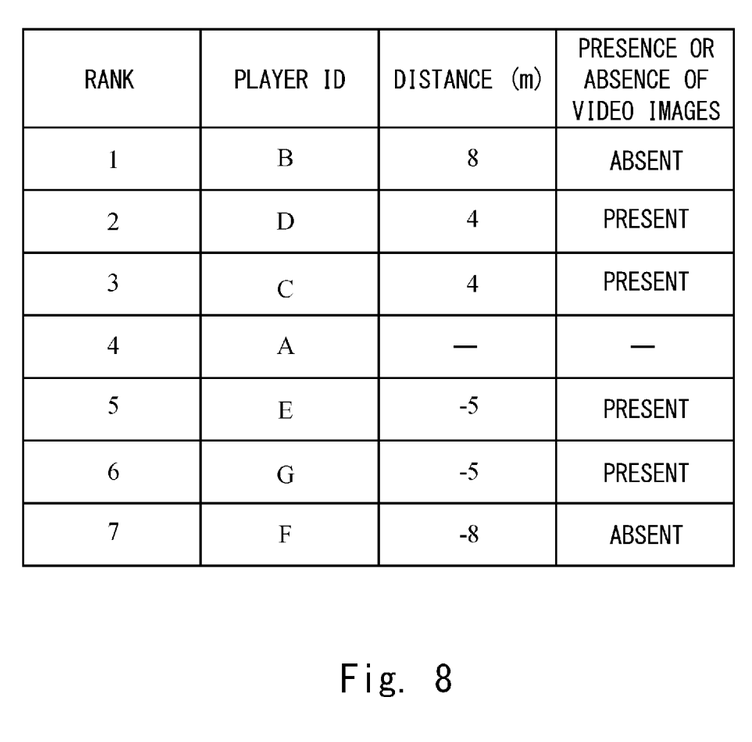
FIG. 8 is a diagram showing one example of related user group information according to a modified example shown in FIG. 7.

FIG. 8 is a diagram showing one example of the related user group information according to a modified example shown in FIG. 7.

As shown in FIG. 8, the related user group information may be generated as a list display indicating the ranking of each player in the running direction. Further, in the item of a distance (m), the distance from the player A to be supported is shown. In this example, the distance is shown with a plus sign for the forward direction from the player A to be supported and with a minus sign for the backward direction therefrom. While the distance from the player A to be supported is shown in FIG. 8, the distance from the start or the distance to the goal may instead be shown.

In this case, thumbnails of data captured by the user devices 40 of the respective players may be displayed in the item indicating the presence or the absence of video images. The presence or the absence of video images here indicates whether or not images of the player A to be supported are being captured. Since video images of the players D, C, E, and G indicate "present" in FIG. 8, the supporter is able to view video images of the player A from the link to these video images. Although the video images of the user devices 40 of the players B and F indicate "absent" in FIG. 8, the supporter is still able to view the video images from the link to these video images.

As described above, the supporter is able to receive the above list by a communication terminal and check the position of the target to be supported. Further, the supporter is able to enjoy realistic video images sent from players near the player to be supported.

In the aforementioned examples, the information distribution program may be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, DVD (Digital Versatile Disc), BD (Blu-ray (registered trademark) Disc), and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 9:
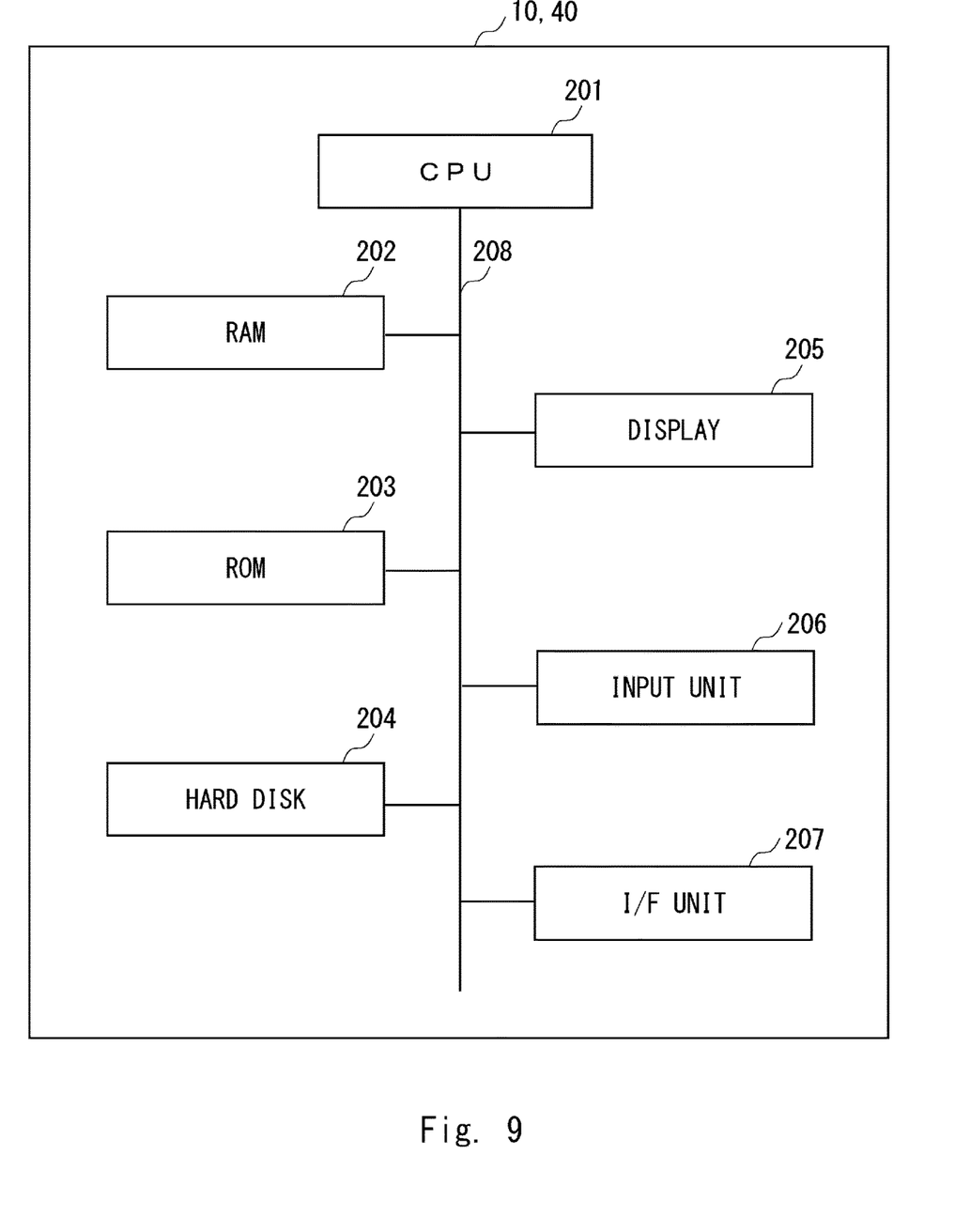
FIG. 9 is a block diagram showing a hardware configuration example of a communication terminal 10 and a server 30.

FIG. 9 is a block diagram showing a hardware configuration example of the communication terminal 10 and the server 30 according to the embodiment. As shown in FIG. 9, each of the communication terminal 10 and the server 30 according to this embodiment is a computer that includes, for example, a Central Processing Unit (CPU) 201, a Random access memory (RAM) 202, and a Read Only Memory (ROM) 203. The CPU 201 performs calculation and control in accordance with software stored in the RAM 202, the ROM 203, or a hard disk 204. The RAM 202 is used as a temporary storage area when the CPU 201 executes various kinds of processing. The hard disk 204 stores, for example, an operating system (OS), and a registration program which will be described later. A display 205 is composed of a liquid crystal display and a graphic controller, and displays objects such as images and icons, a GUI, and the like. An input unit 206, which is an apparatus for a user to give various instructions to the terminal device 200, may be composed of, for example, a touch panel, a mouse, a keyboard and the like. An interface (I/F) unit 207 can control wireless LAN communication and wired LAN communication conforming to standards such as the IEEE 802.11a and communicates with an external device through a communication network the same as the wireless and wired LAN communication networks and the Internet based on a protocol such as TCP/IP. A system bus 208 controls the exchange of data with the CPU 201, the RAM 202, the ROM 203, the hard disk 204, and the like.

Note that the present disclosure is not limited to the above-described embodiments and may be changed as appropriate without departing from the spirit of the present disclosure. For example, in the above-described embodiments, players who participate in a game such as a marathon race wear user devices 40. However, the present disclosure is not limited thereto and the user device 40 may be attached to a mobile body such as a vehicle, a horse, an automobile, or a motorbike. Further, this system is not limited to these games. For example, the user device 40 may be attached to vehicles running on public roads and may be used by a driver (corresponding to a player) and a family member in a home (corresponding to a supporter). In this case, the "player ID (bib)" may be an ID for each vehicle or for each in-vehicle device, i.e., a number plate.

The present disclosure relates to a technique of assisting in observing a specific user from among a large number of users and includes industrial applicability.

What is claimed is:

1. An information distribution apparatus comprising:
    a user information receiving unit configured to receive user information from user devices that respective users have, the user information including user-captured images captured by the respective user devices and positional information of the user devices measured by the respective user devices, and user IDs of the users;
    a positional relation calculation unit configured to calculate positional relation between the users based on the positional information;
    a user specifying unit configured to specify at least one user, as a specific user, from a plurality of pieces of user information;
    an other user extraction unit configured to extract other users other than the specific user, wherein the other users are present near the specific user;
    a related user group information generation unit configured to generate related user group information in which positional information of the user device of the specific user is associated with user-captured images, wherein the user captured images of the related user group information have been captured by each of the user devices of the other users; and
    a distribution unit configured to distribute the related user group information to a communication terminal,
    wherein the other user extraction unit further comprises a captured user determination unit configured to recognize the user-captured images captured by the respective user devices to specify the user, and
    wherein the other user extraction unit extracts at least one other user who is within a predetermined distance from the specific user and wears the user device capturing the specific user based on the positional relation and output of the captured user determination unit.

2. The information distribution apparatus according to claim 1, wherein the related user group information generation unit generates related user group positional information in a form in which the positional information of the user and the positional information of the other users can be displayed as symbols.

3. The information distribution apparatus according to claim 1, wherein, when it is determined that the specific user has been captured, the distribution unit externally distributes the images of the specific user that have been captured.

4. The information distribution apparatus according to claim 1, wherein the user specifying unit comprises a specific user ID information receiving unit configured to receive specific user ID information from an external communication terminal.

5. An information distribution method comprising:
    receiving user information from user devices that respective users have, the user information including user-captured images captured by the respective user devices and positional information of the users measured by the respective user devices, and user IDs of the users;
    calculating positional relation between the users based on the positional information;
    specifying at least one user, as a specific user, from a plurality of pieces of user information;
    extracting other users other than the specific user, wherein the other users are present near the specific user;
    generating related user group information in which positional information of the user device of the specific user is associated with user-captured images, wherein the user captured images of the related user group information have been captured by each of the user devices of the other users; and
    distributing the related user group information to a communication terminal,
    wherein the user-captured images captured by the respective user devices are recognized to specify the user, and
    wherein at least one other user who is within a predetermined distance from the specific user and wears the user device capturing the specific user is extracted based on the positional relation and results of specifying the user.

6. A non-transitory computer readable medium storing an information distribution program for causing a computer to execute following processing of:
    receiving user information from user devices that respective users have, the user information including user-captured images captured by the respective user devices and positional information of the users measured by the respective user devices, and user IDs of the users;
    calculating positional relation between the users based on the positional information;
    specifying at least one user, as a specific user, from a plurality of pieces of user information;
    extracting other users other than the specific user, wherein the other users are present near the specific user;
    generating related user group information in which positional information of the user device of the specific user is associated with user-captured images, wherein the user-captured images of the related user group information have been captured by each of the user devices of the other users; and
    distributing the related user group information to a communication terminal,
    wherein the user-captured images captured by the respective user devices are recognized to specify the user, and
    wherein at least one other user who is within a predetermined distance from the specific user and wears the user device capturing the specific user is extracted based on the positional relation and results of specifying the user.

\* \* \* \* \*